United States Patent [19]

Sugimoto

[11] Patent Number: 5,896,509
[45] Date of Patent: Apr. 20, 1999

[54] NETWORK SYSTEM FOR A PROGRAMMABLE CONTROLLER

[75] Inventor: Tomitsugu Sugimoto, Tokyo, Japan

[73] Assignee: Mitsubishi Denki Kabushiki Kaisha, Tokyo, Japan

[21] Appl. No.: 08/744,640

[22] Filed: Nov. 6, 1996

[30] Foreign Application Priority Data

Jul. 24, 1996 [JP] Japan ................................ 8-194506

[51] Int. Cl.$^6$ ................................................ H04L 12/12
[52] U.S. Cl. ........................ 395/200.58; 364/140.3
[58] Field of Search ................ 370/245; 395/200.5, 395/200.8, 200.66, 200.54, 200.3, 200.6, 200.58; 371/32, 33

[56] References Cited

U.S. PATENT DOCUMENTS 5,123,089  6/1992  Beilinski et al. ............... 395/200.67
5,153,884  10/1992  Lucak et al. .......................... 371/32
5,283,781  2/1994  Buda et al. ........................... 370/246

FOREIGN PATENT DOCUMENTS

61-137444  6/1986  Japan .

*Primary Examiner*—Ellis B. Ramirez
*Assistant Examiner*—William Titcomb
*Attorney, Agent, or Firm*—Sughrue, Mion, Zinn Macpeak & Seas, PLLC

[57] ABSTRACT

A programmable controller network system having station data for each of a number of remote stations set in a response frame of a test frame in an initial cycle. The station data is then sent in the initial cycle to the programmable controller and link data including the number of remote modules, the type of input/output to and from each remote module, and the number of input or output data units is automatically set.

7 Claims, 14 Drawing Sheets

FIG.2A (Initial cycle)

FIG.2B (Refresh cycle)

FIG.2C (Return cycle)

FIG.3A

Basic frame

F : Frag pattern
A1, A2 : Adress data
ST1, ST2 : Status data
DATA : Input data or output data and message data
CRC : Error control data {X16+X12+X15+1}

FIG.3B

Transmission frame for master station polling & refresh data

FIG.3C

Transmission frame for polling data

FIG.3D

Transmission frame for remote station response

FIG.3E

Transmission frame for master station test polling data

FIG.3F

Transmission frame for remote station test loopback data

FIG.4

| Remote station module | Station Number | Number of data units |
|---|---|---|
| Remote terminal module | 1 | 2 |
| Remote input module | 2 | 1 |
| ⋮ | | |
| Remote input module | m | 1 |
| Remote terminal module | m+1 | 2 |
| Remote output module | m+2 | 2 |
| ⋮ | | |
| Remote output module | n | 1 |

| Pointer | Data definition | |
|---|---|---|
| 1 | Remote station number | |
| | Remote station mode | |
| | Receive buffer Address | L |
| | | H |
| 2 | Remote station number | |
| | Remote station mode | |
| | Receive buffer Address | L |
| | | H |
| 3 | Remote station number | |
| | Remote station mode | |
| | Receive buffer Address | L |
| | | H |
| 4 | | |
| n | Remote station number | |
| | Remote station mode | |
| | Receive buffer Address | L |
| | | H |

---▶ 76543210

Polling vaild/invaild bit
0 : Invaild
1 : Vaild

NETWORK SYSTEM FOR A PROGRAMMABLE CONTROLLER

FIELD OF THE INVENTION

The present invention relates to a network system for a programmable controller in which a programmable controller (described as PLC hereinafter) having a communicating function is communicably connected to a remote module through a transmission path, and more particularly to a network system for a programmable controller for setting link data such as a number of stations for connection and a number of input/output data each required for the network to the PLC.

BACKGROUND OF THE INVENTION

The communicating function of the PLC in the network system for a programmable controller in which the PLC having a communicating function and other communicating device (remote module) are connected to each other through the transmission path is divided into two types of communications such as communications with an input/output unit (described as a remote I/O module hereinafter) having only ON/OFF data and communications with a remote terminal unit (described as a remote terminal module hereinafter) having ON/OFF data and processing data.

Generally, in the former type of communications (remote I/O module), even the input and output units located at a remote site have a configuration in which data is fixed by each station and is communicated without determining a type of input/output unit (indicating an input unit, an output unit, and an I/O mixed unit) and a type of data units (indicating 16 data units, 32 data units, and 64 data units) so that it is not required to especially grasp these link data in the PLC side.

In the latter type of communications (remote terminal module), a remote station itself has various types of data including ON/OFF data, processing data, and message data, so that, in a case where efficiency of the network is considered, it is required to check a connecting state of the remote station in a master station (PLC).

Accordingly, in the network system for a programmable controller including therein a remote terminal module, link data such as a number of stations for connection and a number of input/output data is required to be set in the PLC.

Conventionally, for setting the link data, such measures as those described below are taken;

firstly, a switch for setting is provided in the master station;

secondly, a specified area is provided in a device memory in the master station;

thirdly, a transfer command for link data is programmed anew therein, and the link data is set according to a ladder program; and fourthly, specified parameters for the data are provided therein.

However, in the first setting system, a switch for setting has to be provided therein, so that upsizing and higher price of the device are inevitable, in the second and fourth setting systems, a particular area for linking is provided therein, so that increase of a memory capacity required is inevitable, and the particular area for linking is provided therein if the connection to a remote station is possible in a case where the area has not yet been connected thereto, so that an unnecessary processing time is disadvantageously added to the original processing time. Accordingly, a processing speed is reduced due to communications with a non-connected area.

The third setting system disclosed in Japanese Patent Laid-Open Publication No. SHO 61-137444 is required to execute a ladder program, so that increase of a step capacity required for the ladder program incorporated in the PLC can not be prevented, and if the ladder program is not set in the stand-by state for running even after a power is turned ON, the network is not established, and for this reason, data communications between communicating devices can not be established.

SUMMARY OF THE INVENTION

It is an object of the present invention to obtain a network system for a programmable controller in which link data can be set in a PLC side without causing upsizing and higher price of the device, reduction of a processing speed, and increase of a step capacity required for a ladder program; a network is established without awareness of another station returning to the line or getting out therefrom; the network can successfully be established even in a case where a remote station is delayed in starting up with respect to the master side of the PLC; any error in any remote station can be recognized before the network is established, and regular operations of the network can be insured even in a case where an extra remote station is added to the existing stations after the stations are set by disadvantageously duplicating a station number.

In the network system for a programmable controller according to the present invention, station data of a station is set in a response frame of a test frame to each remote module in an initial cycle, and link data is automatically set therein with the initial cycle.

In the network system for a programmable controller, a next station to be accessed and a receive buffer are identified according to a station number in the response frame from a remote module and a number of input/output data units therein.

In the network system for a programmable controller according to the present invention, an area of the own station is recognized from the fresh frame according to the station number.

In the network system for a programmable controller, any remote module delayed in starting up when a test frame is issued is regarded as a reserving station, and presence or absence of a remote module handled as the reserving station is periodically checked, so that a network is re-constructed, in other words, link data is updated.

In the network system for a programmable controller according the present invention, a remote module set over the last station number is removed from a line of the network in a stage of issuing the test frame.

In the network system for a programmable controller according to the present invention, an interlock with a test frame is executed to a station delayed in starting up.

Other objects and features of this invention will become understood from the following description with reference to the accompanying drawings.

DESCRIPTION OF THE PREFERRED EMBODIMENTS

Detailed description is made hereinafter for an embodiment of the network system for a programmable controller according to the present invention with reference to the related drawings.

Figure 1:
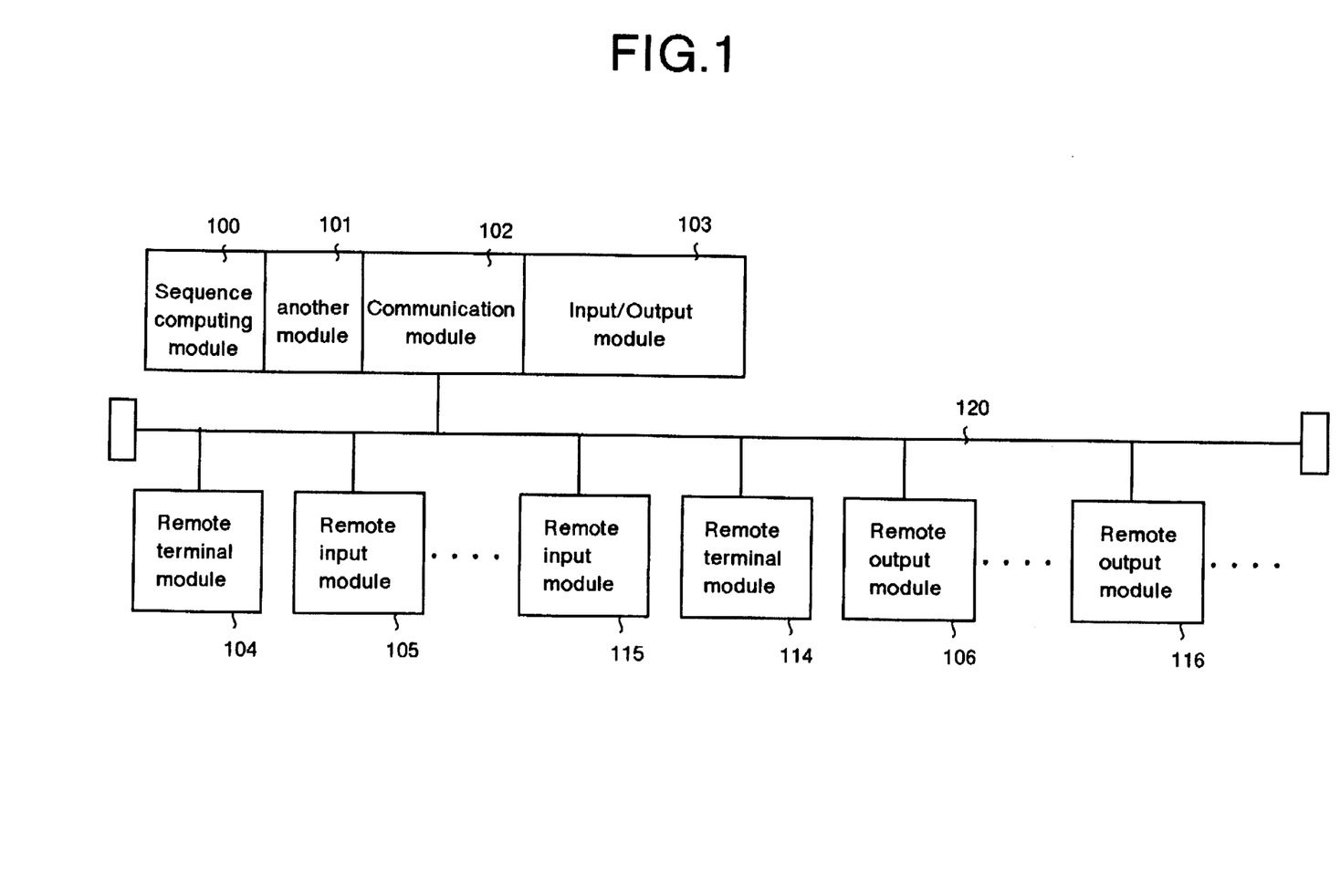
FIG. 1 is a block diagram showing an example of system configuration of a network system for a programmable controller.

FIG. 1 shows an example of system configuration of the network system for a programmable controller in the embodiment. This network system comprises a sequence computing module (CPU module) 100 for executing a sequence program, another module 101 for executing processing excluding the sequence computing and communicating processings, a communication module (master station) 102 as an executing module for communicating with each remote station, an input/output module 103 for controlling an input/output, remote terminal modules 104, 114 each for controlling analog-conversion data or the like excluding the input/output, remote input modules 105, 115 each for controlling an input of an input signal through a limit switch or the like, and remote output module 106, 116 each for controlling an output of an output signal to a lamp or the like; and the sequence computing module 100, another module 101, communication module 102, and input/output module 103 are connected to each other through a buss, and the communication module 102 and each of the remote modules 104 to 116 are interactively and communicably connected to each other through a line of transmission path 120.

In the network system, data is communicated between a master station with the communication module 102 and each of the remote modules (remote stations) 104 to 116 each connected to the master station according to three types of communication cycle; an initial cycle for communication when a power is turned ON, a refresh cycle for communication according to polling data prepared by the initial cycle, and a return cycle for communication at each cyclic time interval according to data for an error generating station.

Figure 2A:
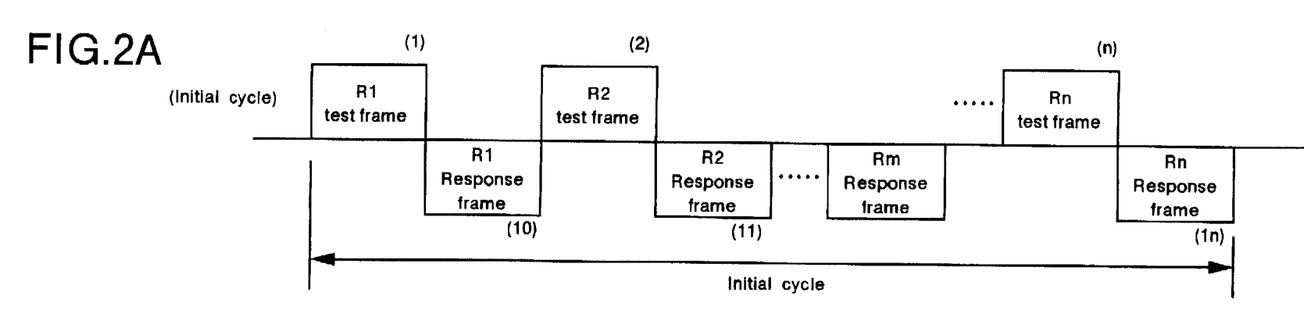
FIG. 2A is a timing chart showing a sequence of communication of an initial cycle in the network system for a programmable controller according to the present invention.
Figure 2B:
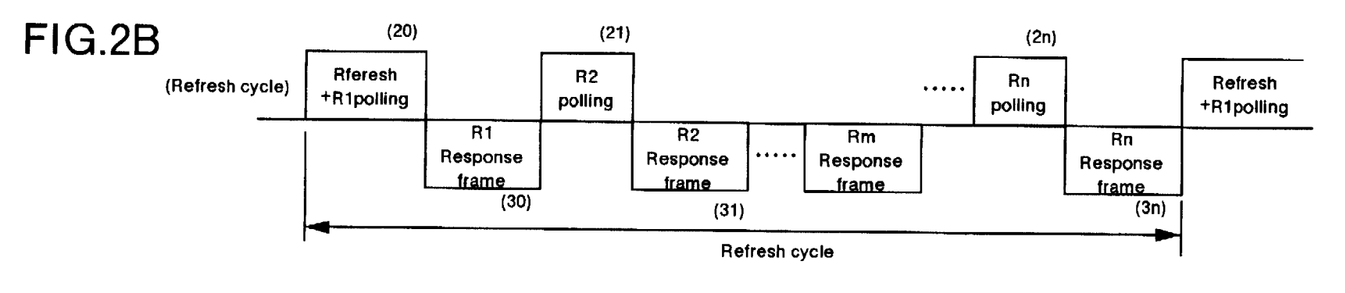
FIG. 2B is a timing chart showing a sequence of communication of a refresh cycle in the network system for a programmable controller according to the present invention.
Figure 2C:
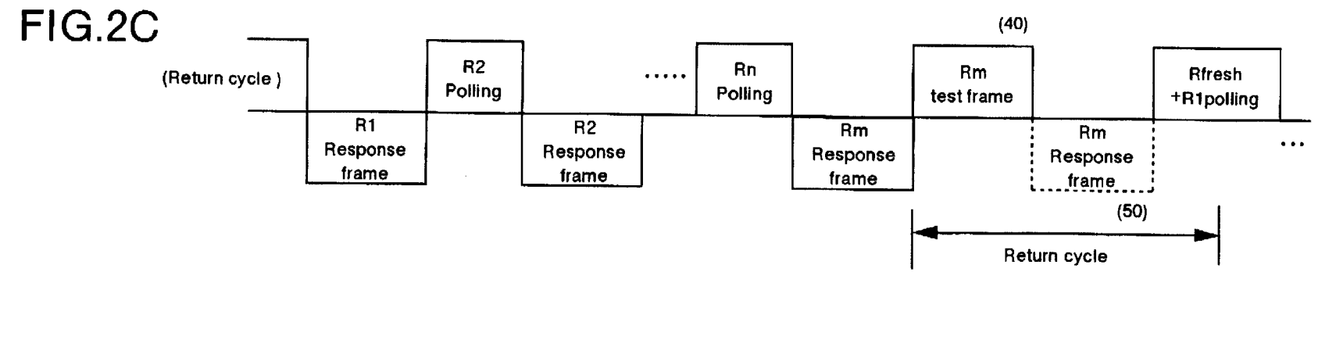
FIG. 2C is a timing chart showing a sequence of communication of a return cycle in the network system for a programmable controller according to the present invention.

The initial cycle is executed according to the sequence of communication shown in FIG. 2A, the refresh cycle according to that shown in FIG. 2B, and the return cycle according to that shown in FIG. 2C respectively.

It should be noted that, in the initial cycle shown in FIG. 2A, the reference numerals (1), (2) to (n) indicate master station test polling data sent from the master station to each remote station, and the reference numeral (1) indicates a message to a first machine of the remote station, the reference numeral (2) indicates a message to a second machine thereof, and the reference numeral (n) indicates a message to an N-th machine thereof. Also the reference numerals (10), (11) to (1n) indicate remote station loopback data sent from each remote station to the master station, and the reference numeral (10) indicates a message from the first machine of the remote station, the reference numeral (11) indicates a message from the second machine thereof, and the reference numeral (1n) indicates a message from the N-th machine thereof.

In the refresh cycle shown in FIG. 2B, the reference numeral (20) indicates master station polling and refresh data globally sent from the master station to each remote station, and the reference numerals (21) to (2n) indicate polling data sent from the master station to each remote station, the reference numeral (21) indicates a message to the second machine of the remote station, and the reference numeral (2n) indicates a message to the n-th machine thereof. Also the reference numerals (30), (31) to (3n) indicate remote station responded data sent from each remote station to the master station, and the reference numeral (30) indicates a message from the first machine of the remote station, the reference numeral (31) indicates a message from the second machine thereof, and the reference numeral (3n) indicates a message from the n-th machine thereof.

In the return cycle shown in FIG. 2C, the reference numeral (40) indicates master station test polling data (a message) sent from the master station to an m-th machine of the remote station, and the reference numeral (50) indicates remote station loopback data (a message) sent from the m-th machine of the remote station to the master station.

Figure 3A:
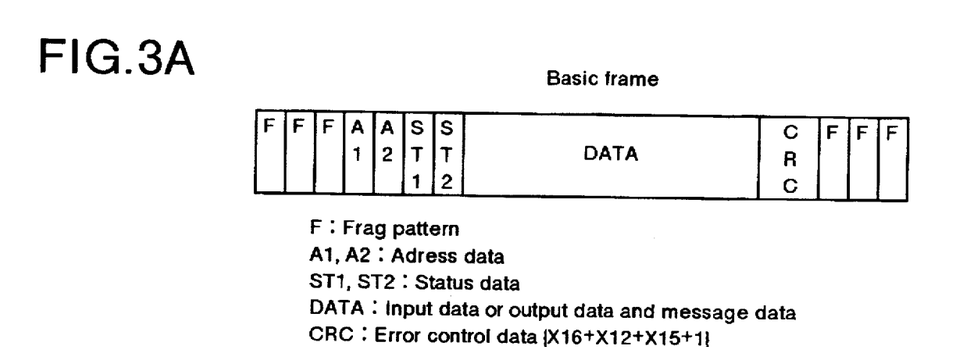
FIG. 3A is an explanatory view showing one of various types of transmission frame format used in the network system for a programmable controller according to the present invention.

FIG. 3A to FIG. 3F show transmission frames each used in the network system. FIG. 3A shows a basic frame thereof. The basic frame has a message between flag patterns F indicating a start and an end of the message, and the message comprises address data A1, A2, status data ST1, ST2, input or output data and message data DATA, and error control data CRC.

Figure 3B:
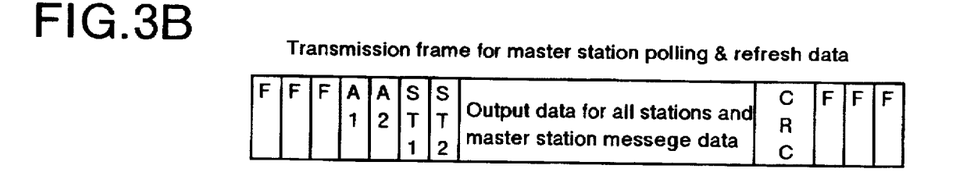
FIG. 3B is an explanatory view showing one of the various types of transmission frame format used in the network system for a programmable controller according to the present invention.

FIG. 3B is a transmission frame for global refresh data for data communications from the master station to each remote station when data is communicated therebetween and for polling data to the first machine, and output data for the whole station and master station message data are set in the DATA section.

Figure 3C:
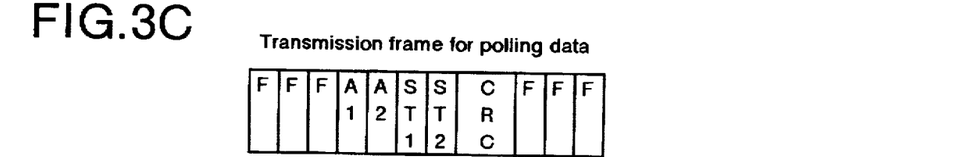
FIG. 3C is an explanatory view showing one of the various types of transmission frame format used in the network system for a programmable controller according to the present invention.

FIG. 3C shows a transmission frame for polling data.

Figure 3D:
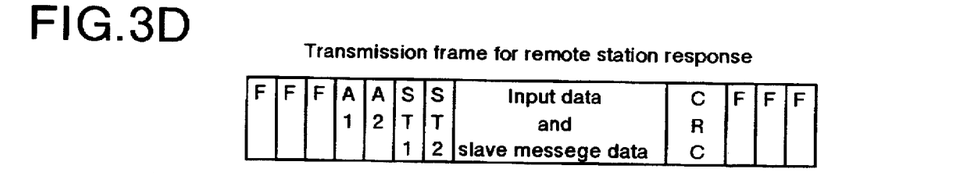
FIG. 3D is an explanatory view showing one of the various types of transmission frame format used in the network system for a programmable controller according to the present invention.

FIG. 3D is a transmission frame for remote station response data for the polling, and input data for its own station and message data to slave stations are set in the DATA section.

Figure 3E:
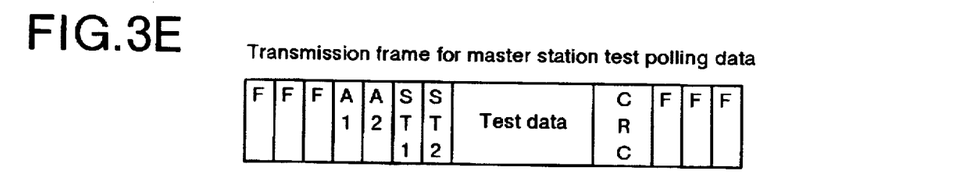
FIG. 3E is an explanatory view showing one of the various types of transmission frame format used in the network system for a programmable controller according to the present invention.

FIG. 3E is a transmission frame for master station test polling data, and the test data is set in the DATA section.

Figure 3F:
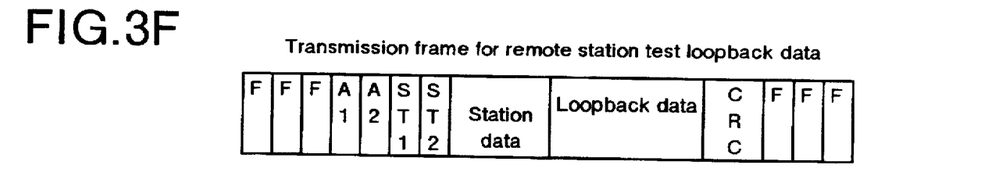
FIG. 3F is an explanatory view showing one of the various types of transmission frame format used in the network system for a programmable controller according to the present invention.
Figure 4:
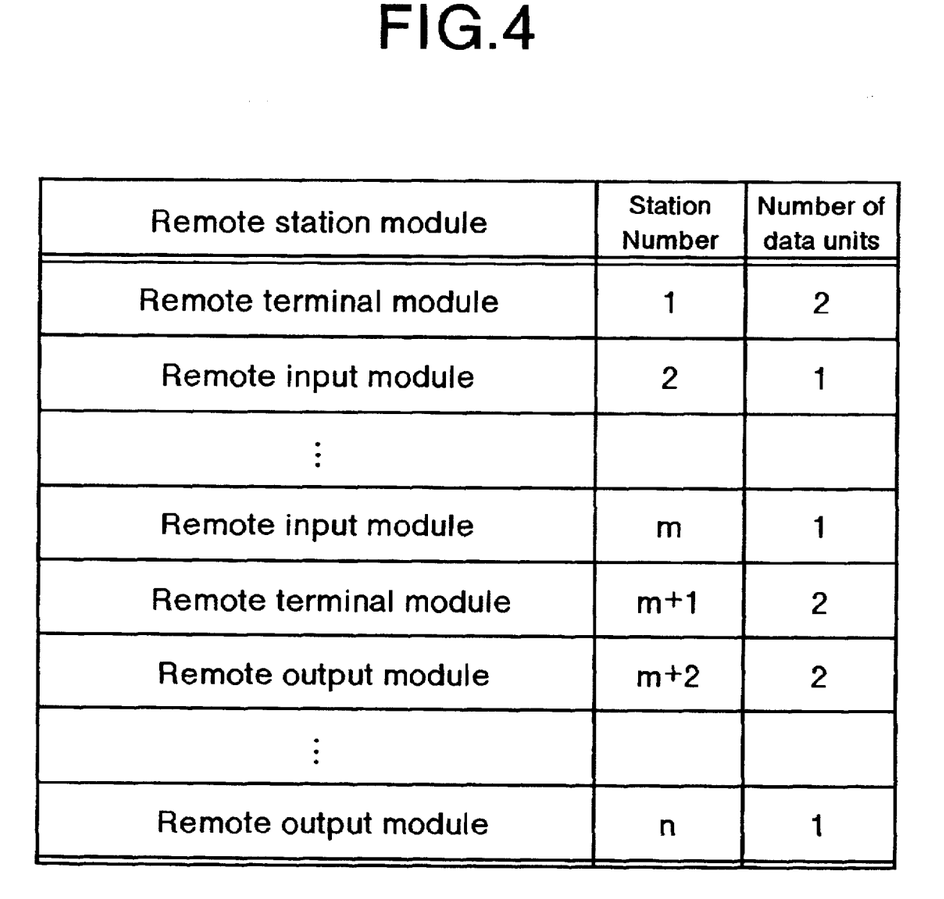
FIG. 4 is an explanatory view showing the contents of a station data.

FIG. 3F is a transmission frame (test frame) for remote station test loopback data to the master station test polling, and station data (own station data) and loopback test data are set in the DATA section. The station data, as shown in FIG. 4, is link data including therein a station number and a number of input/output data for each remote station module.

Figure 9:
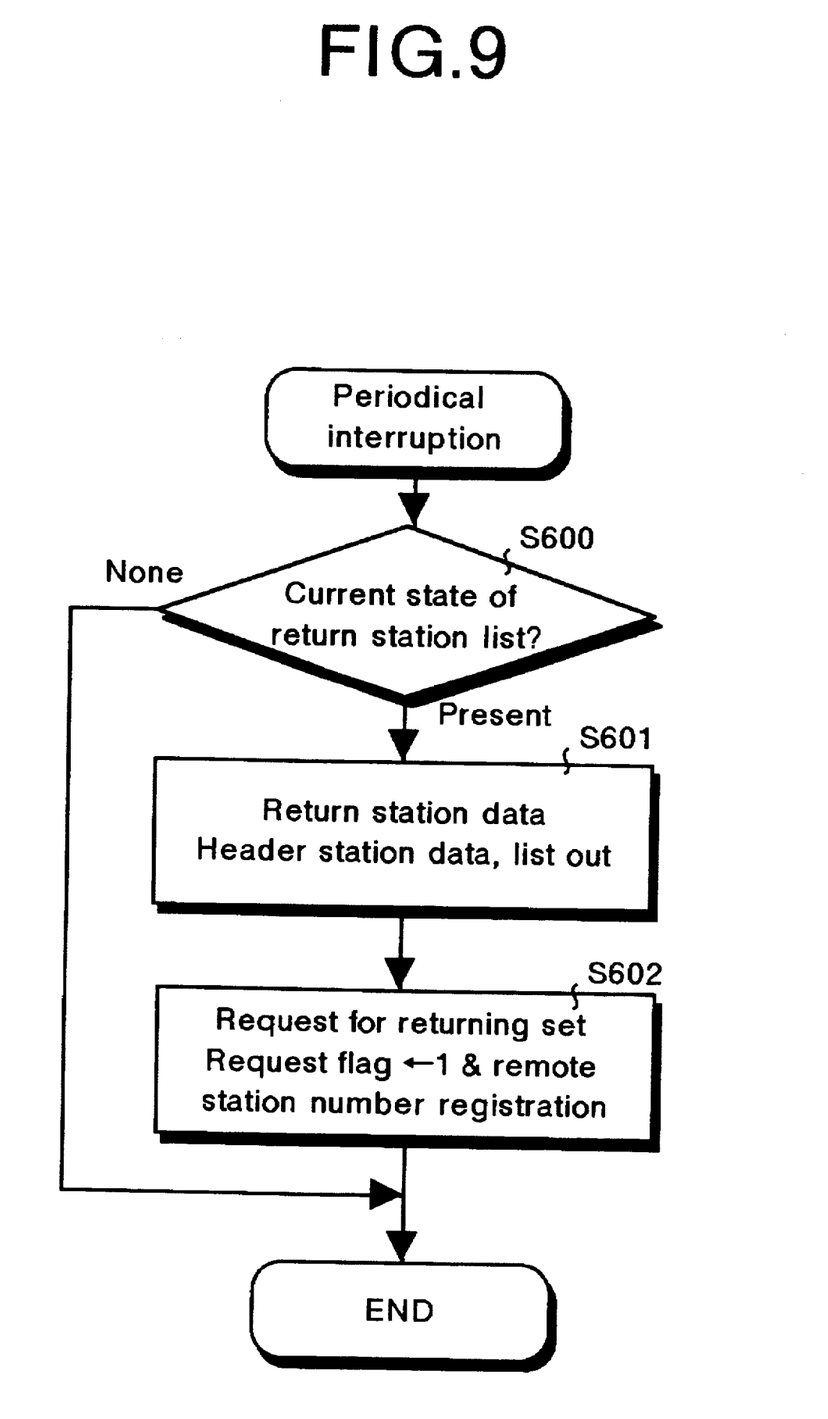
FIG. 9 is a flow chart showing a cyclic interrupt routine of a return cycle.
Figure 10:
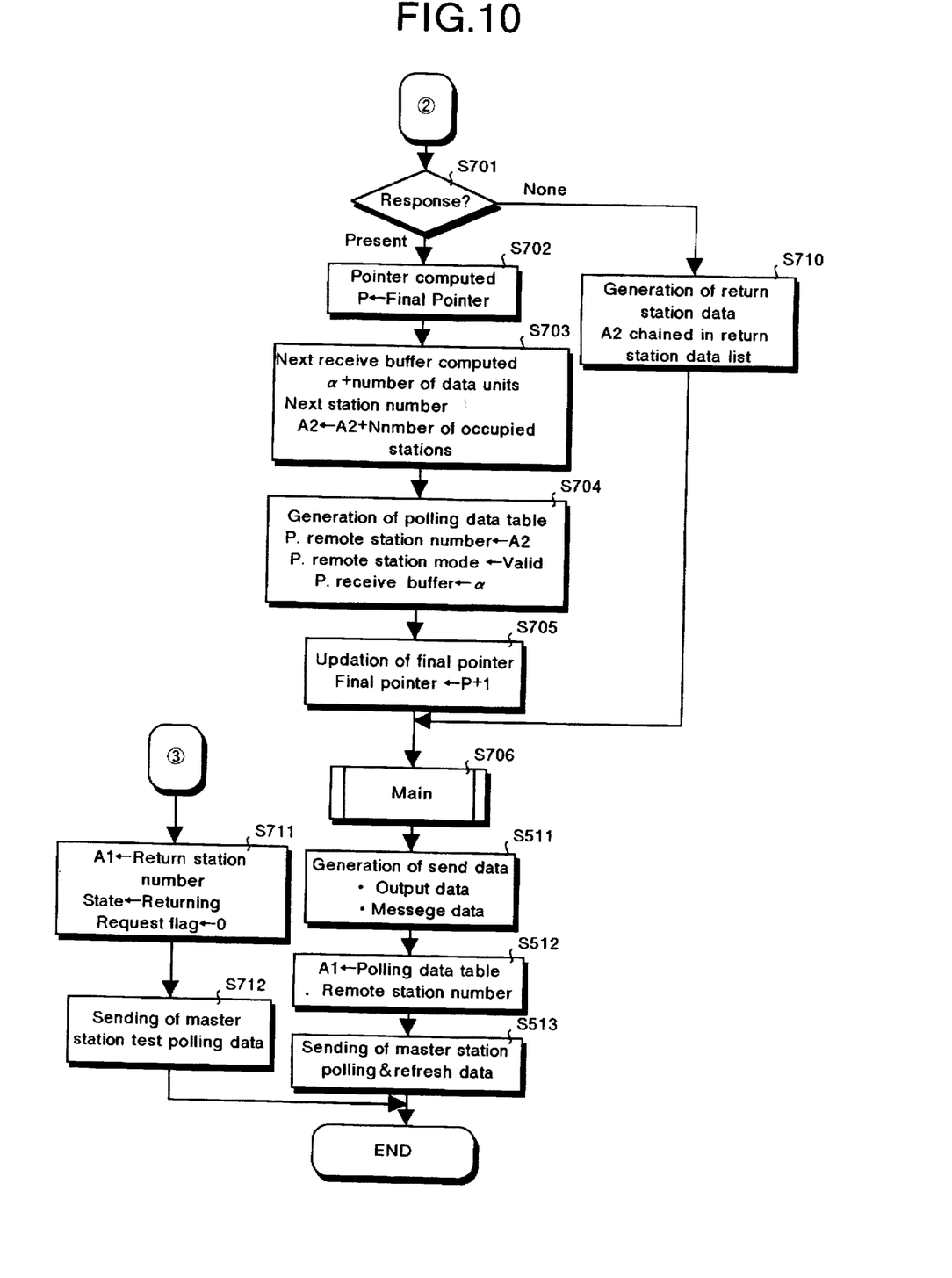
FIG. 10 is a flow chart showing a portion corresponding to the return cycle of a receive interrupt routine in the master station.
Figure 11:
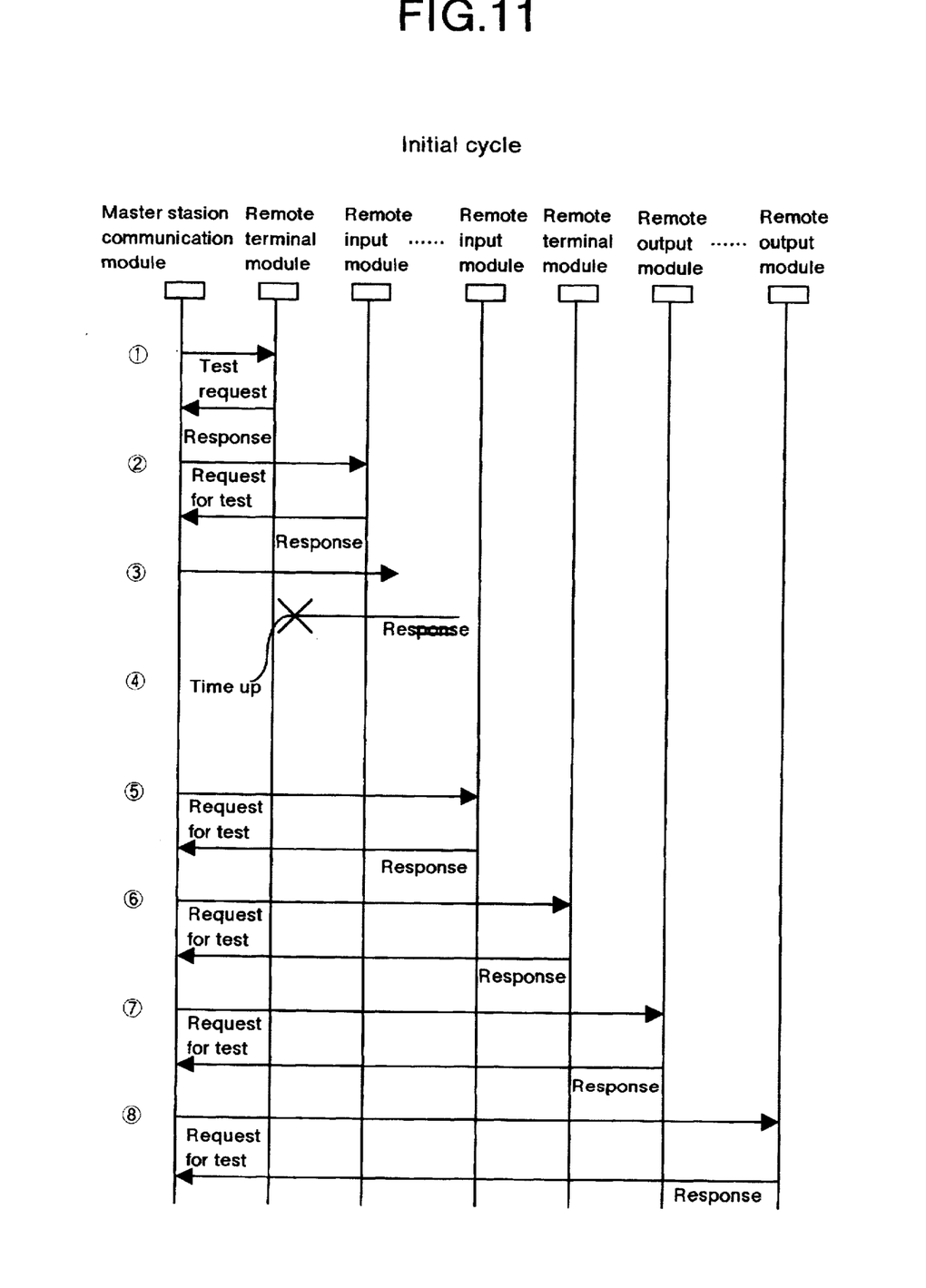
FIG. 11 is a state sequence view showing the initial cycle in the network system for a programmable controller according to the present invention.
Figure 12:
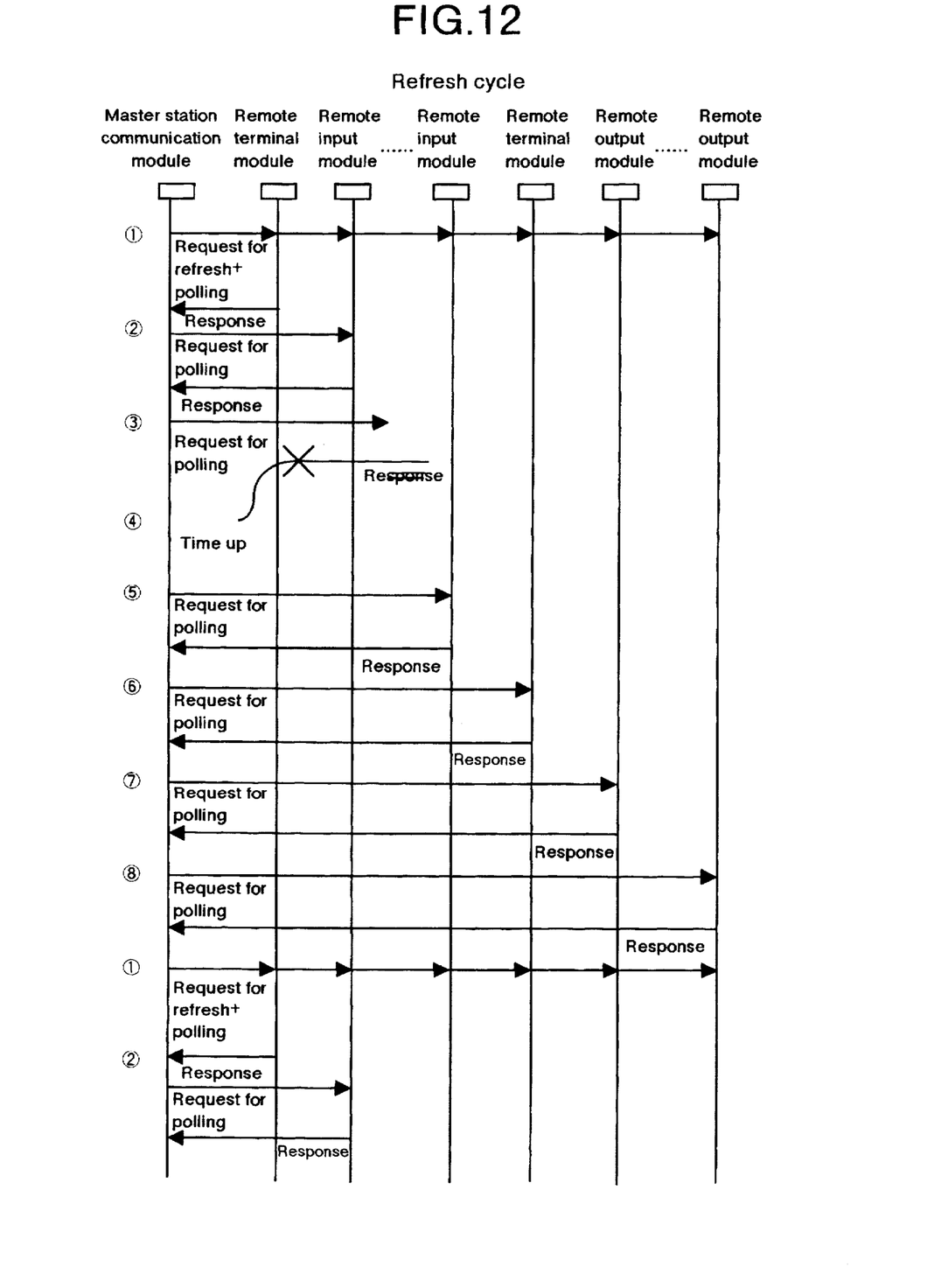
FIG. 12 is a state sequence view showing the refresh cycle in the network system for a programmable controller according to the present invention.
Figure 13:
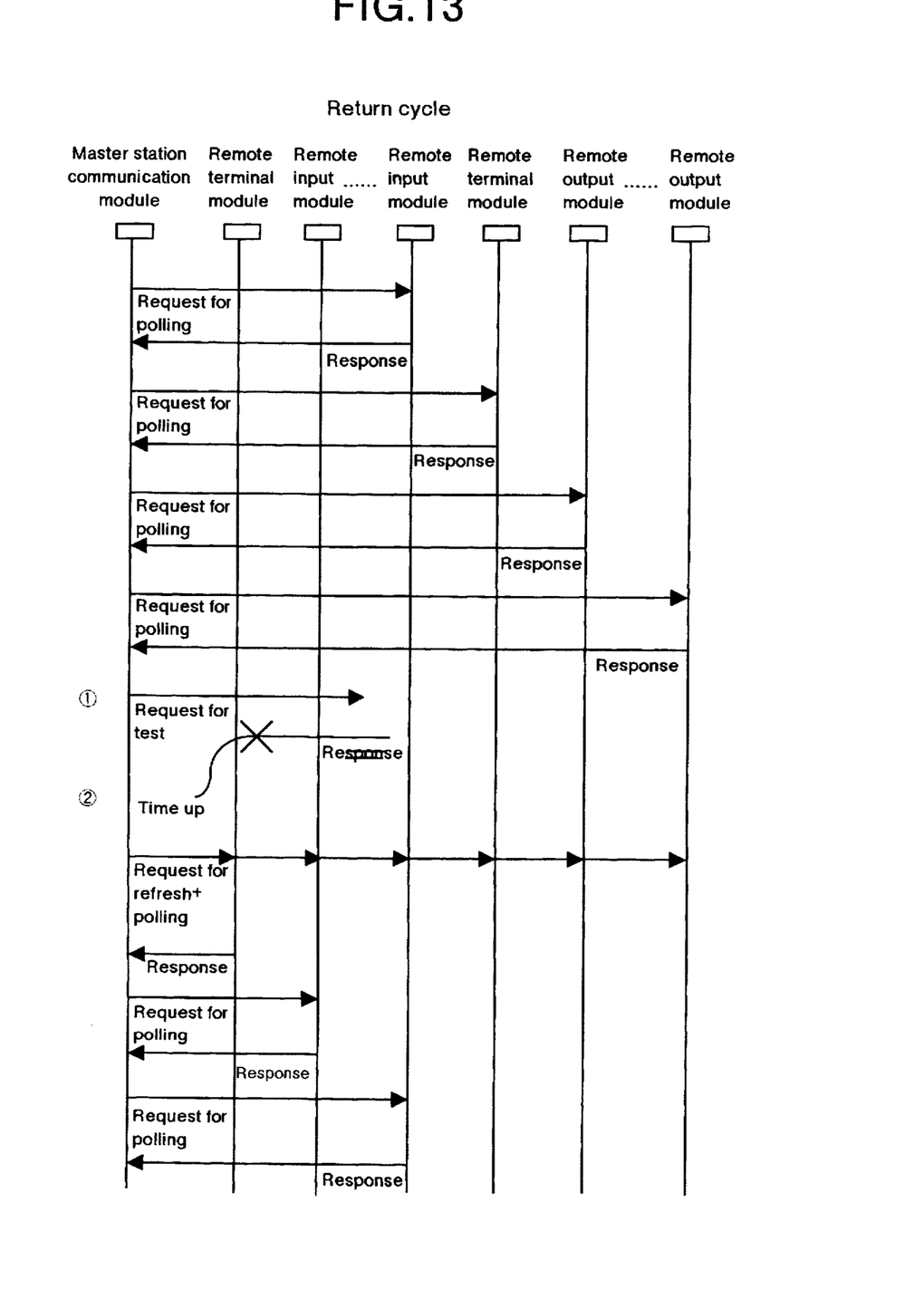
FIG. 13 is a state sequence view showing the return cycle in the network system for a programmable controller according to the present invention.

Next description is made for operations for each communication cycle in the network system for a programmable controller according to the present invention with reference to flow charts each shown in FIG. 5 to FIG. 10 and state sequence views each shown in FIG. 11 to FIG. 13.

Figure 5:
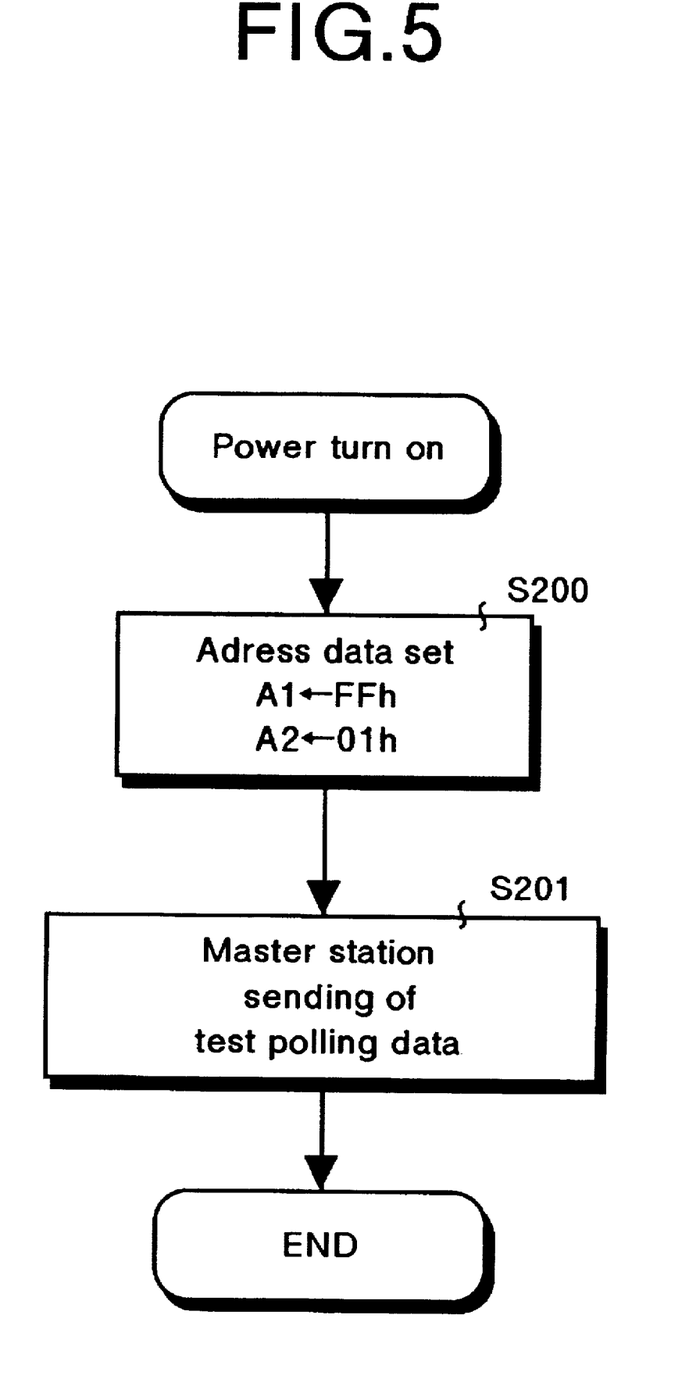
FIG. 5 is a flow chart showing sending operations of a master station in the initial cycle.

FIG. 5 shows a sending operation flow of the master station (communication module 102) in the initial cycle. In this sending operation flow, at first, the communication module 102 sets A1 and A2 as address data in a station number 1 to send a data frame for a master station test polling for the transmission frame format shown in FIG. 3E (Step S200), adds test data to the frame, and sends the frame to a remote terminal module 104 (Step S201).

The remote terminal module 104 checks the A1 received when receiving the test data for the master station test polling data frame with its own station number, and in a case where both are identical to each other, stores the test data in a loopback test buffer, and after CRC is checked, adds as a return data its own station data and the data stored in the loopback test buffer to the remote station test loopback data frame for the transmission frame format shown in FIG. 3F as a response frame, and sends the frame to the master station.

It should be noted that, in checking the received A1 with the own station number, in a case where both are not identical to each other, the whole receive frame is aborted.

Figure 6:
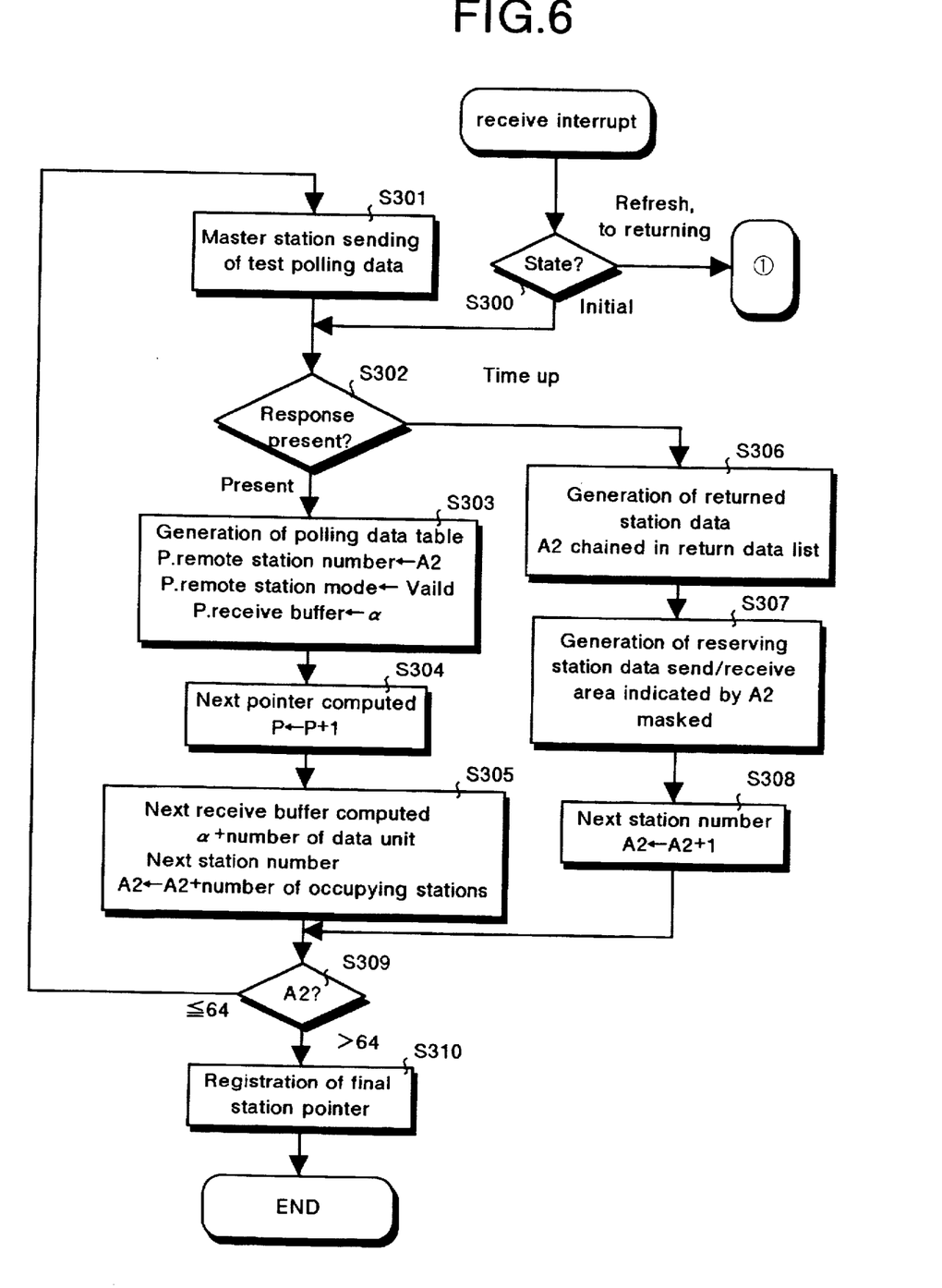
FIG. 6 is a flow chart showing a portion corresponding to the initial cycle of a receive interrupt routine in the master station.

The master station determines the received state in the receive interrupt processing shown in FIG. 6 (Step S300), and in a case where the remote station test loopback data frame (FIG. 3F) as a response frame is returned thereto (Step S302), checks A2 when the master station test polling data frame was sent with the received A1, and stores the A2 in the remote station number of a pointer P in a polling data table and a header address in a receive buffer address respectively, then sets a mode to '1' to enable the polling (Step S303), and advances the pointer P of the polling data table to the next (Step S304).

The master station derives a next station number (a number of occupying stations is added to the station number) and a receive buffer address (a data size is added to the receive buffer address) from the number of occupied data for the remote station data and the data size thereof (Step S305), sends the master station test polling data frame to the next remote station (Step S301).

In a case where the A2 when the master station test polling data frame is sent is not identical to the received A1 or in a case where a response monitoring time is up before the remote station test loopback data frame as a response frame is returned, the master station adds the remote station number to the return station data list as the number of a station to be handled in the reserving station (Step S306). In this case also, the station number sent in the previous time is advanced by one (Step S307), and the master station test polling data frame is sent to the next remote station (Step S301).

Figure 14:
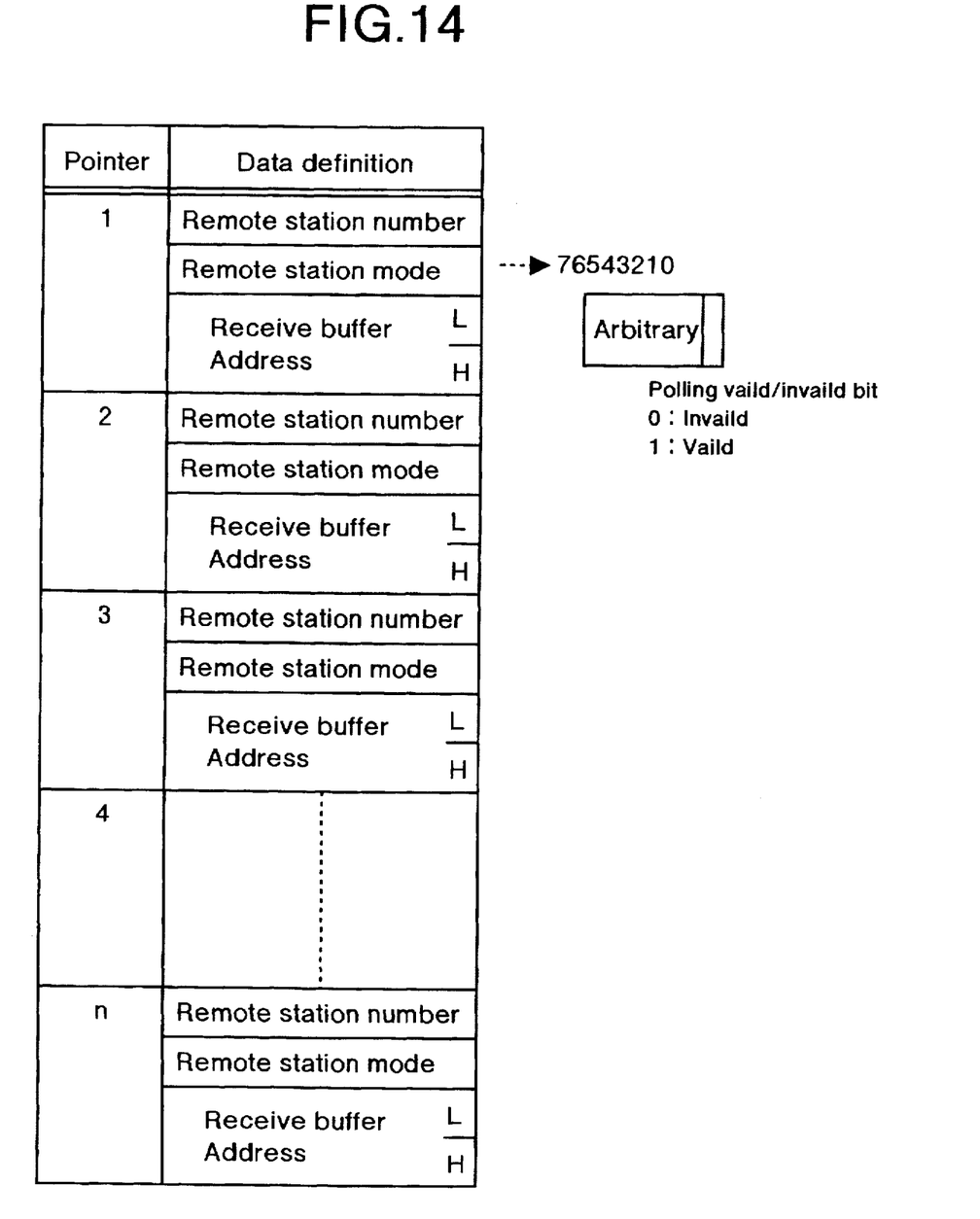
FIG. 14 is an explanatory view showing configuration of a table for polling data used in the network system for a programmable controller according to the present invention.

As shown in FIG. 2A and FIG. 11, the master station repeats the processing described above until the station number reaches the maximum station number, for instance, 64 (Step S308), registers a last station pointer, and prepares the table of polling data as shown in FIG. 14 and a list of return station data (not shown herein) in which return stations are listed.

With this feature, namely with the initial cycle, the master station can grasp link data including therein a number of communicating devices (slave stations) each connected to the network system, types of input/output of each communicating device and a number of data units thereof.

Figure 7:
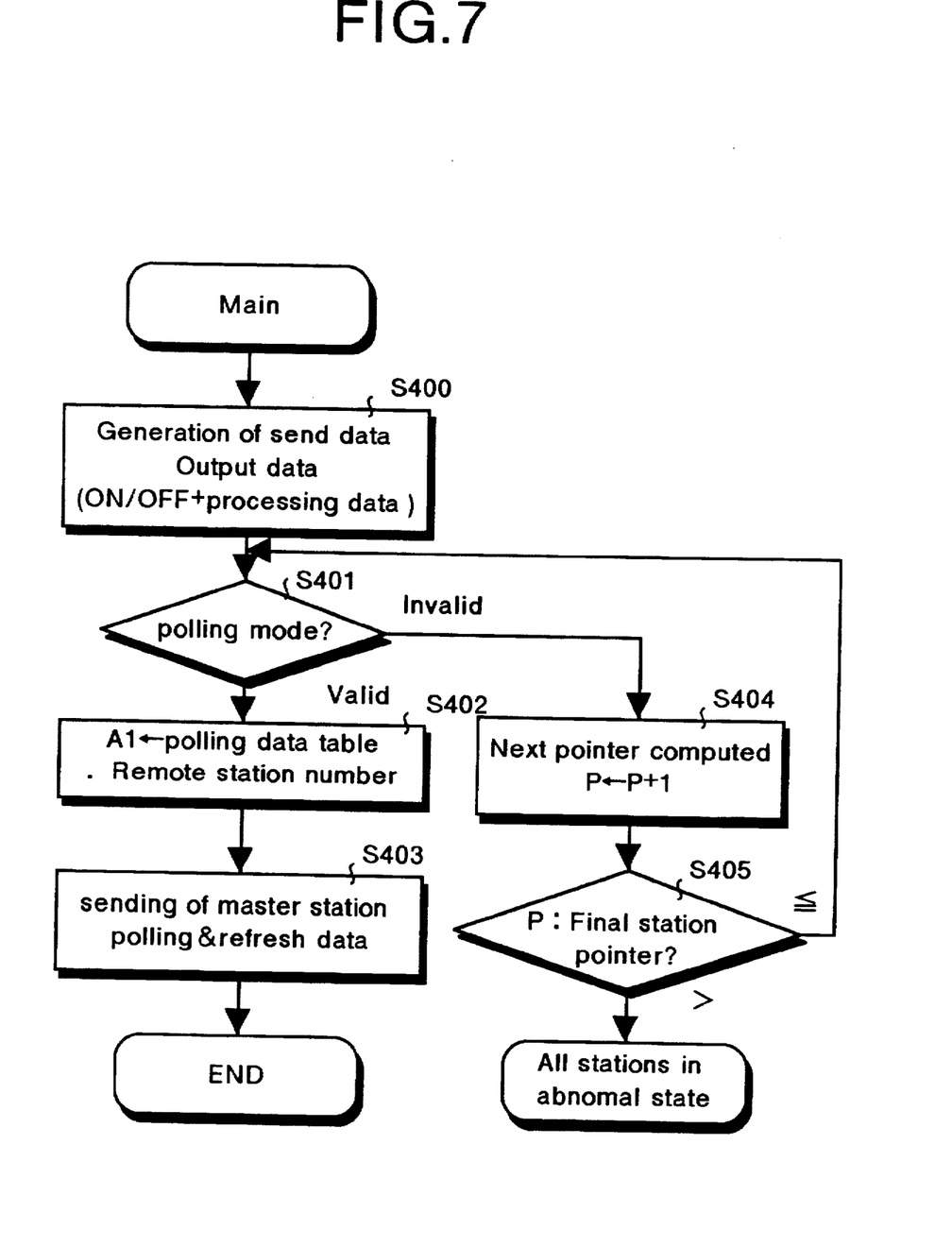
FIG. 7 is a flow chart showing sending operations of a master station in the refresh cycle.

FIG. 7 shows a sending operation flow of the master station (communication module 102) in the refresh cycle. In this sending operation flow, at first, the communication module 102 prepares refresh data (comprising output data for all stations and master station message data) corresponding to the data obtained by multiplying the last station number by a number of occupying data units per station (Step S400), stores a station number to the first station in the A1 according to the remote station number pointed by the pointer P in the polling data table shown in FIG. 14 prepared by the initial cycle (Step S402), and sends the number to the remote terminal module 104 by using the master station polling & refresh data frame with the transmission frame format shown in FIG. 3B (Step S403).

However, in a case where the number is specified to be invalid according to the polling mode (Step S401), the communication module adds 1 (one) to the next pointer P up to the last station pointer for searching any station number specified to be valid (Steps S404, S405).

The remote terminal module 104 checks whether the A1 received when receiving refresh data for the master station polling & refresh data frame is identical to its own station number or not, and in a case where both are identical, stores the refresh data by a number of data units occupying the own station from an address corresponding to one obtained by multiplying the own station number by a number of occupying data units per station in the receive buffer. The above description indicates that an area of the station can be recognized from its own number because of the fact that a number of occupying data units per station is fixed, and in the system configuration shown in FIG. 1, the remote terminal module with a station number of m+1 recognizes data for two station of the refresh data Rm+1 as data for the own station.

The remote terminal module 104 fetches the data as a receive data after the CRC is checked, and adds refresh send data (the input data and a slave station message data) to the remote station response frame for a transmission frame format as a response frame shown in FIG. 3D, and sends the synthesized data.

In checking whether the received A1 is identical to its own station number or not, in a case where both station numbers are not identical, the remote terminal module stores the refresh data by a number of data units occupying its own station from an address corresponding to one obtained by multiplying its own station number by a number of occupying data units per station in the receive buffer, checks the CRC, and enters the stand-by state for receiving the master station polling data frame for a transmission frame format.

Figure 8:
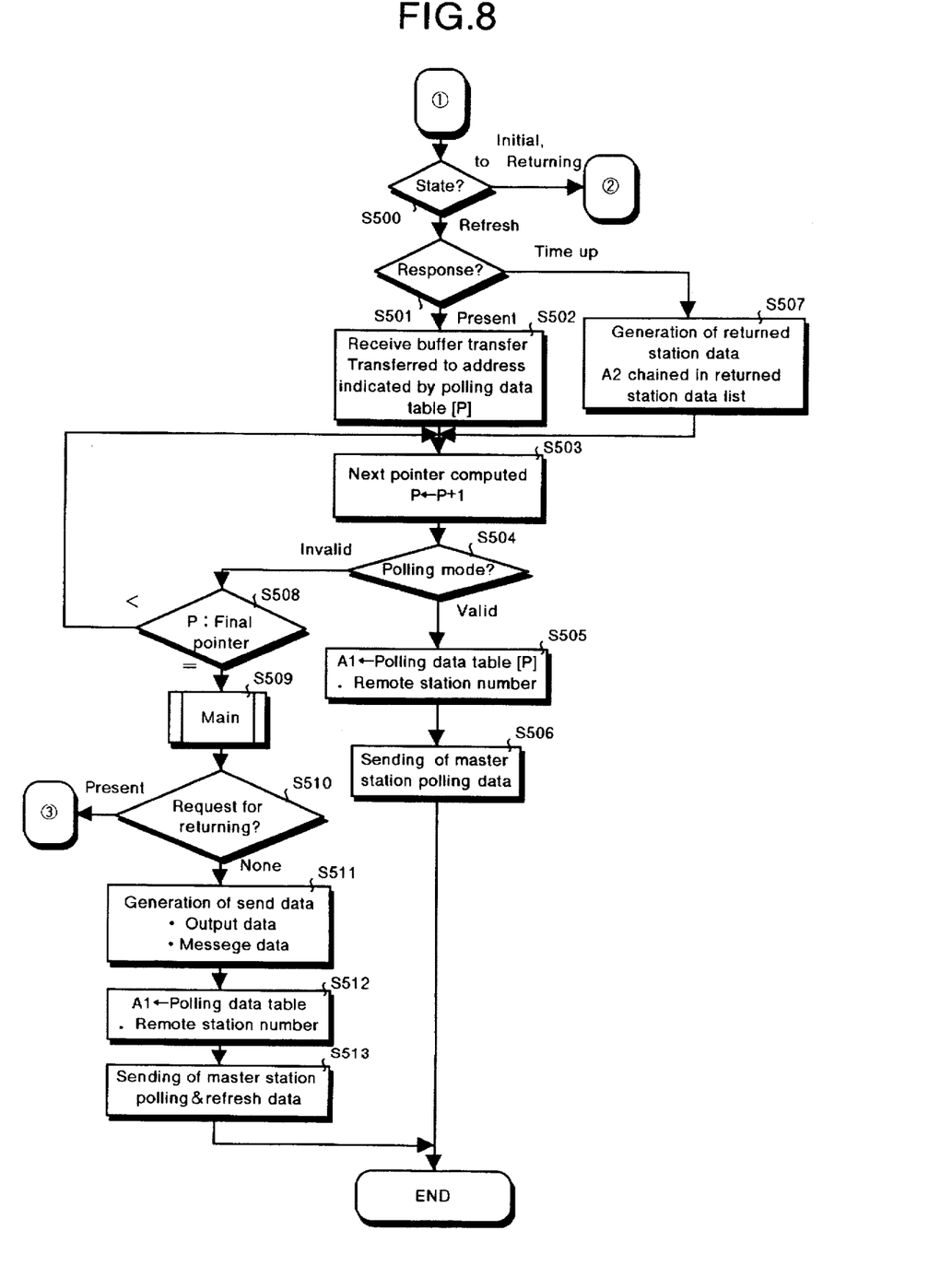
FIG. 8 is a flow chart showing a portion corresponding to the refresh cycle of a receive interrupt routine in the master station.

The master station side determines the receiving state in the receive interrupt processing shown in FIG. 6 and FIG. 8 (Steps S300, S500), and in a case where the remote station response frame (FIG. 3D) as a response frame is returned thereto (Step S501), checks the A2 received when the master station refresh & polling data frame was sent with the received A1, derives a receive buffer address (receive buffer address specified by the pointer P) from the polling data table, and stores the input data and slave station message data in the receive buffer (Step S502).

In contrast, in a case where the A2 received when the master station refresh & polling data frame was sent is not identical to the received A1, or in a case where a response monitoring time is up before the remote station response frame as a response frame is returned thereto (Step S501), the master station adds the remote station number A2 to the return station data list (Step S507).

Then the master station advances the pointer P of the polling data table shown in FIG. 14 to the second station and on, computes a station specified as valid by the polling mode (Steps S503, S504, S508), stores the station number of the point P in the A1 (Step S505), sends the polling data frame of a transmission frame format shown in FIG. 2C to the corresponding slave station, for instance, to the remote input module 105 (Step S506).

In a case where the remote station number (pointer P) shown in the polling data table is equal to the last station number (Step S508), the pointer P is returned (Step S509).

A slave station such as a remote terminal module 105 or the like checks the received A1 with its own station number, and in a case where both are identical to each other, fetches the received data stored in the receive buffer when the master station refresh & polling data frame was received as data after the CRC is checked, adds the send data to the remote station response frame (FIG. 3D) as a response frame, and sends the added data to the master station.

After all the number of stations set in the polling data is checked, the slave station determines the presence or absence of a request for returning (Step S510), and then, as shown in FIG. 2B and FIG. 12, the slave station sends the master station polling & refresh data frame again to the first station (Steps S511, S512, S513), and repeats this operation described above from this step and on.

FIG. 9 shows a cyclical interrupt processing routine for a return cycle, and FIG. 13 shows a state sequence in the return cycle. In a processing executed within a constant cycle, a current state of the return station data list prepared in the initial cycle and refresh cycle is checked (Step S600), and in a case where a return station is chained in the list, lists out the return station data from the header of the returning data list (Step S601), and registers the remote station number by setting the returning request flag to '1' (Step S602).

The master station receives a returning request in the receive interrupt processing (Refer to FIG. 8, FIG. 10) (Step S510), and sends the master station test polling data frame shown in FIG. 3E to the slave station of a return station number at an interval between the master station refresh & polling data frames. (Steps S711, S712).

As shown in FIG. 10, the master station adds a data size (Steps S702, S703) to a receive buffer address of the polling data table indicated by the last pointer to any responded remote station (Step S701), stores the A2 when the master station test polling data frame is sent in the remote station number of the polling data table in which the last pointer is put forward by one and the storage address in the receive buffer address respectively, sets the mode to '1' to enable the polling (Step S704), and updates the last pointer for preparing the next cycle (Step S705).

After the step described above, the master station returns the pointer P (Step S706), and sends the master station polling & refresh data frame again to the first station (Steps S511, S512, S513).

The slave station such as the remote terminal module 105 or the like checks the received A1 with the own station number, and in a case where both are identical to each other, fetches as data the received data stored in the receive buffer when the master station refresh & polling data frame was received after the CRC was checked, adds the send data to the remote station response frame (FIG. 3D) as a response frame, and sends the added data to the master station.

It should be noted that the remote station not responding to the master station is chained again in the return station data list (Step S710).

The polling data table for all of the 64 stations is kept in consideration of a sequence of starting up of a power. However, a length of send data is decided according to the last station number among which stations exist in consideration of the sending efficiency.

As an initial operation of a remote station, the remote station enters a state for limitlessly waiting for the master station test polling data from the master station of the PLC, sends the remote station test loopback data to the master station, and then executes input/output processing to and from the outside after the received master station polling & refresh data or the polling data is detected, and starts the timer up for monitoring the state of the master station.

As understood from the description above, with the network system for a programmable controller according to the present invention, link data is automatically set in the initial cycle in which a test frame with link data set in the PLC of the master station is sent to each remote station (remote module), so that load to the tool for setting link data or a ladder program can validly be reduced. A connecting state in a remote station can be known before the network is established, so that an efficient network can also be constructed.

With the network system for a programmable controller according to another feature of the present invention, a next station to be accessed and a receive buffer can be identified according to the station number in the response frame from a remote module and to a number of input/output data therein, so that an efficient network can be constructed.

With the network system for a programmable controller according to another feature of the present invention, an area for a station is recognized from a refresh frame according to its own station number, so that a network can be constructed without awareness of another remote station returning to and getting out from the line, and for this reason an efficient network can be established.

The master station in this case always sends the master station polling & refresh or polling data, has a monitoring timer for the master station polling & refresh or polling data, executes presetting when the data is received, and monitors any error generated in the master station.

With the network system for a programmable controller according to the present invention, a remote module set overriding the last station number is removed from the line of the network in a stage of issuing the test frame, so that any error state in the remote station can be recognized before the network is established, and a connecting state of the remote station can be known before the network is established, and for this reason efficient network can be established.

With the network system for a programmable controller according to the present invention, an interlock is executed by the test frame to a station delayed in starting up, so that, by aborting refresh data even if a refresh frame is received before the test frame is received, the remote station does not run, and maintains the current state, so that the network can normally operate in a case where a station number is added to the existing station number overlaid thereon later, and even in a case where a remote station is added to the existing station by duplicating the station number later, the remote station is in a state for waiting for the test frame as an initial operation of the remote station to be added, and for this reason the station can be normally operated.

This application is based on Japanese patent application No. HEI 8-194506 filed in the Japanese Patent Office on Jul. 24, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of operating a network system for a programmable controller, comprising; communicably connecting said programmable controller to a plurality of remote modules through a transmission path; setting station data for each of a plurality of stations in a response frame of a respective test frame for each remote module in an initial cycle, sending the station data for each remote module to the programmable controller during the initial cycle, and automatically setting link data in the programmable controller, said link data including therein a number of remote modules present in the system, types of input/output of each remote module, and a number of data units.

2. A network system for a programmable controller according to claim 1, wherein a next station to be accessed and a receive buffer are identified according to a station number in the response frame from a remote module and a number of input/output data units therein.

3. A network system for a programmable controller according to claim 1, wherein a number of occupying data units per station of remote modules is fixed, and an area of a station is recognized from a refresh frame according to a station number.

4. A network system for a programmable controller according to claim 1, wherein any remote module delayed in starting up when the test frame is issued is regarded as a reserve station, and presence or absence of the remote module to be handled as a reserving station is cyclically checked, whereby a network is established.

5. A network system for a programmable controller according to claim 1, wherein a remote module set overriding a last station number is recognized in a stage of issuing the test frame, and the remote module is removed from the line of the network.

6. A network system for a programmable controller according to claim 1, wherein, as a processing of a remote module, an interlock with the test frame is provided therein to a station delayed in starting up.

7. A network system including a programmable controller, comprising;

a plurality of remote modules communicably connected to said programmable controller;

means for setting station data for each of a plurality of stations in a response frame of a test frame for each remote module;

means for transmitting said station data to said programmable controller in an initial cycle; and means for automatically setting link data in the programmable controller in response to at least said station data, said link data including information on at least the number of said remote modules and input/output characteristic information on said remote modules.

* * * * *